June 12, 1928.
W. R. BROWN
AUTOMOBILE AWNING
Filed Nov. 12, 1926
1,672,926
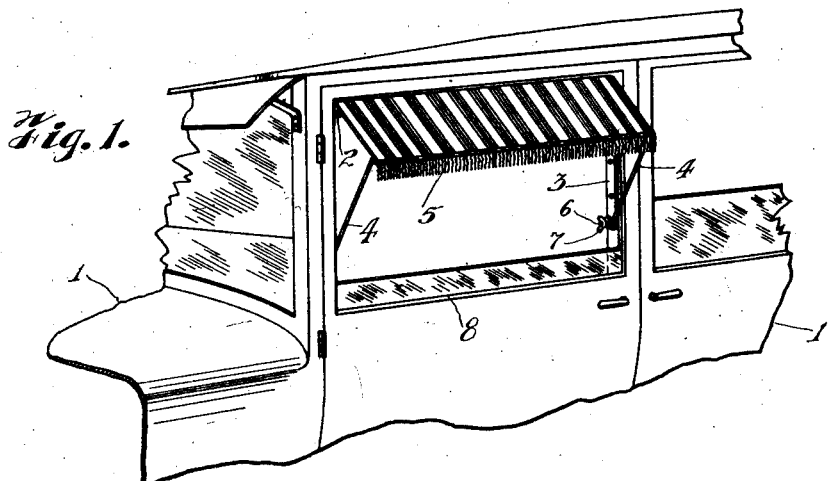
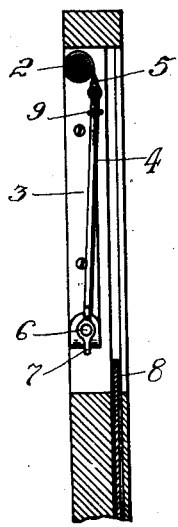
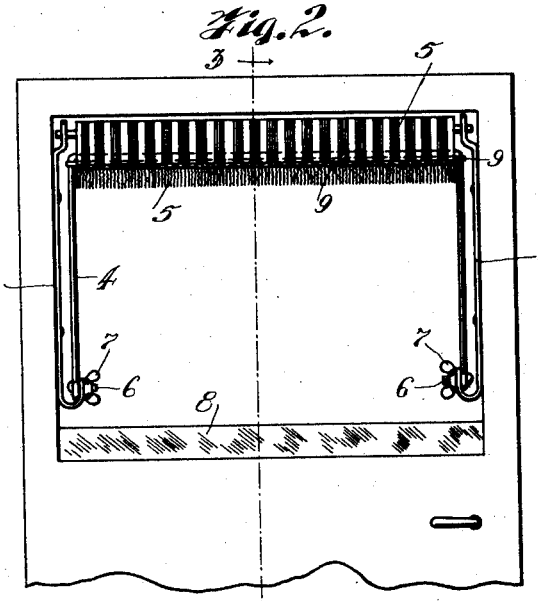
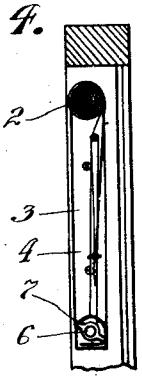
William R. Brown
INVENTOR.
BY Ernest A. Wood
ATTORNEY.

Patented June 12, 1928.

1,672,926

UNITED STATES PATENT OFFICE.

WILLIAM R. BROWN, OF DENISON, TEXAS, ASSIGNOR OF ONE-HALF TO GEORGE E. BLAND AND ONE-FOURTH TO W. E. COX, BOTH OF DENISON, TEXAS.

AUTOMOBILE AWNING.

Application filed November 12, 1926. Serial No. 147,892.

This invention relates to awnings and shields, especially for automobiles, and it refers more particularly to an article of the character designated whose principal object is to supply the need of an awning for automobiles capable of folding up interiorly of the vehicle so as to prevent its deterioration and discoloration by the weather when not in use for the purposes specified.

The invention further comprehends as one of its objects, an awning capable of serving in a dual capacity, that is, when employed as an awning to obtain relief from the sun's rays, it is necessary that the car window glass be lowered and remain so, and on the other hand, when the glass is raised the invention functions very nicely as a window curtain, if desired.

A further object of the invention resides in its apparent simple construction, operation and ready installation, enabling the article to be manufactured and dispensed at a nominal cost.

With these foremost objects in view, the invention has particular reference to its novel features of construction and arrangement of parts, which will be manifested in the detail description to follow, taken in connection with the appended drawings, wherein:

Figure 1 represents a fragmentary view of a closed motor vehicle illustrating the invention, as it performs the function as an awning.

Figure 2 is a further view showing the invention in folded position.

Figure 3 is a view on lines 3—3 of Figure 2, and

Figure 4 represents the invention as used for a curtain.

It may be stated in continuing further in detail that the collapsible automobile awning and sun shade has precedented the present invention in so far as collapsibility is concerned, and while these awnings may efficiently perform in the capacity intended, some of them have no provisions by which they may be moved inside the vehicle and protected from the effects of the weather, unless however, they be dismantled and stored away, which is a disadvantage and possibly detrimental.

The present invention, while it may not be used as an awning while the car window is closed, its dual function as a curtain very effectually overcomes this minor disadvantage, and the invention is thus protected against the weather effects.

Continuing now more in detail with the drawings, the reference character 1 designates a closed vehicle, either sedan or coupé model, since it is upon the automobile windows that the invention will be more extensively used.

A roller 2, which is of the conventional design is employed, and has the usual round pin at one end, while the opposite end is flattened and held much in the same manner as the usual window shade, so as to wind the torsion spring contained within the roller.

Brackets 3 are applied in opposed relationship to the inner sides of the window upon which the awning is to be applied. These brackets are so constructed as to enable them to be applied without making any additional screw holes in the frame, it being merely necessary to remove the screws normally employed to hold the lathing forming a part of the door or window frame, place the bracket in position and replace the screws. The tops of the brackets 3 are turned outwardly and upwardly to admit the curtain roller 2, and since it is a conventional and well known method, the usual aperture and slot to admit the curtain pins are not illustrated in the brackets to hold the curtain spring under tension. The lower ends of the brackets are turned abruptly upwards, and between the U thereby formed resides one of the looped ends of the awning extension frame 4, the latter being passed between the two plies of material forming the awning 5. Pins 6 are passed through the ends of the frame and a wing nut 7 applied thereon, whereby the frame 4 may be secured at any angle desired with respect to the opening, against the tension of the roller spring. When the nuts 7 are loosened, the awning automatically reverts back to its position inwardly of the window glass 8.

Particular reference to Figures 2 and 3 will disclose that in the hem of the awning 5 is sewed a reinforcing wire 9 looped at its ends so as to embrace either of the sides of the frame 4. Since the awning 5 is composed of two thicknesses of material, the frame 4 is enabled to move freely between the plies and thus leave the awning free to be actuated at will independently of the frame. This feature enables the awning, after the frame 4 assumes the position shown in Figure 3, to be pulled down, on the order of a window curtain, without affecting in any manner the position of the frame 4 or brackets 3. The reinforcing wire 9, since its ends embrace the frame sides as set forth previously, functions to constrain the curtain against displacement.

It is obvious that the invention can be quickly converted from an awning to a curtain without the slightest preparation or inconvenience, and when neither the curtain nor awning is desired, the appearance of the invention on the car is a feature of considerable import as a decorative and ornamental arrangement, to enhance the beauty of the car.

Manifestly, the construction shown is capable of considerable variation and such variation as is in keeping with the appended claims is considered as being within the spirit of the invention.

I claim—

1. In an awning, a bracket member adapted for vertical attachment to the sides of an opening and having means adjacent its uppermost end for supporting a spring controlled roller for carrying said awning; a frame member pivotally connected at its end to the lowermost end of said bracket, a rod arranged in the hem of said awning having a looped end freely slidable on the side of said frame and means for locking said frame with respect to said bracket at each position to which it is moved.

2. In an awning, a bracket member adapted to be mounted vertically on the sides of an opening interiorly of the closure for said opening and having means adjacent its uppermost end for supporting a spring controlled roller for carrying said awning; a substantially U shaped frame member pivotally connected at its ends to the lower extremity of said bracket and whose sides are shorter than said bracket whereby to enable said frame to pass below said roller in the extreme raised position, and means for locking said frame against the tension of said roller spring at any position in which said frame is moved with respect to said bracket.

In testimony whereof I affix my signature.

WILLIAM R. BROWN.